United States Patent
Tanaka et al.

(10) Patent No.: US 12,005,487 B2
(45) Date of Patent: Jun. 11, 2024

(54) METHOD OF MANUFACTURING LAMINATED CORE

(71) Applicant: NIPPON STEEL CORPORATION, Tokyo (JP)

(72) Inventors: Ichiro Tanaka, Tokyo (JP); Kazutoshi Takeda, Tokyo (JP); Minako Fukuchi, Tokyo (JP); Shinsuke Takatani, Tokyo (JP); Shuichi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/800,851

(22) PCT Filed: Jun. 17, 2021

(86) PCT No.: PCT/JP2021/023047
§ 371 (c)(1),
(2) Date: Aug. 18, 2022

(87) PCT Pub. No.: WO2021/256537
PCT Pub. Date: Dec. 23, 2021

(65) Prior Publication Data
US 2023/0080376 A1    Mar. 16, 2023

(30) Foreign Application Priority Data
Jun. 17, 2020 (JP) .................. 2020-104252

(51) Int. Cl.
*B21D 28/14* (2006.01)
*H01F 41/02* (2006.01)
*H02K 15/02* (2006.01)

(52) U.S. Cl.
CPC ............. *B21D 28/14* (2013.01); *H01F 41/02* (2013.01); *H02K 15/02* (2013.01); *H02K 15/024* (2013.01)

(58) Field of Classification Search
CPC ......... B21D 28/14; B21D 28/22; H01F 41/02; H02K 15/02; H02K 15/024
See application file for complete search history.

(56) References Cited

U.S. PATENT DOCUMENTS

| 2018/0001369 | A1 | 1/2018 | Senda et al. |
| 2022/0130606 | A1 | 4/2022 | Shimobe |
| 2023/0080376 | A1* | 3/2023 | Tanaka ............... B21D 28/22 83/39 |

FOREIGN PATENT DOCUMENTS

| CN | 101040022 A | 9/2007 |
| CN | 100476030 C | 4/2009 |
| CN | 107206457 A | 9/2017 |
| EP | 3 238 847 A1 | 11/2017 |
| EP | 3 239 998 A1 | 11/2017 |

(Continued)

*Primary Examiner* — Minh N Trinh
(74) *Attorney, Agent, or Firm* — Birch, Stewart, Kolasch & Birch, LLP

(57) ABSTRACT

Provided is a method of manufacturing a laminated core by punching electrical steel strips including an insulation coating to obtain core single sheets and laminating the core single sheets, the method including: pressurizing two or more electrical steel strips using a guide roller to temporarily bond the electrical steel strips immediately before the punching; and obtaining the core single sheets by performing the punching after inserting the two or more electrical steel strips after the temporary bonding into a punching die.

16 Claims, 6 Drawing Sheets

(56) References Cited

FOREIGN PATENT DOCUMENTS

| | | |
|---|---|---|
| JP | 2005-191033 A | 7/2005 |
| JP | 2005-297393 A | 10/2005 |
| JP | 2006-49719 A | 2/2006 |
| JP | 2015-168839 A | 9/2015 |
| JP | 2016-9710 A | 1/2016 |
| JP | 2020-113647 A | 7/2020 |
| RU | 2 357 994 C2 | 6/2009 |

* cited by examiner

METHOD OF MANUFACTURING LAMINATED CORE

TECHNICAL FIELD OF THE INVENTION

The present invention relates to a method of manufacturing a laminated core.

Priority is claimed on Japanese Patent Application No. 2020-104252, filed Jun. 17, 2020, the content of which is incorporated herein by reference.

BACKGROUND ART

A laminated core used in a motor (rotating electrical machine) is manufactured by punching an electrical steel sheet into a predetermined shape and laminating the punched steel sheet in a die. Recently in order to reduce iron loss in motor products, an electrical steel sheet having a reduced thickness is used for these products. However, in the electrical steel sheet having a reduced thickness, there is a problem that does not occur in a method of manufacturing a laminated core in the related art. For example, the number of times of punching increases. The reason for this is that, when the sheet thickness of the electrical steel sheet is reduced to half of that in the related art, the number of times of punching is doubled. In order to secure productivity equivalent to that in the related art, it is necessary to increase the punching speed. It is necessary to reduce the sheet thickness of the electrical steel sheet to narrow a clearance of a punching die, and there is a limit in increasing the punching speed in order to secure the lifetime of the punching die.

Patent Document 1 describes a method of manufacturing a laminated core. Patent Document 1 describes a technique of bonding two or more electrical steel sheets and punching the laminate in order to improve productivity. However, in Patent Document 1, the laminate is heated to completely cure or incompletely cure an adhesive layer formed between the electrical steel sheets. Therefore, the productivity cannot be sufficiently improved.

PRIOR ART DOCUMENT

Patent Document

[Patent Document 1] Japanese Unexamined Patent Application, First Publication No. 2005-191033

DISCLOSURE OF THE INVENTION

Problems to be Solved by the Invention

The present invention has been made in consideration of the above-described circumstances, and an object thereof is to provide a method of manufacturing a laminated core having excellent productivity.

Means for Solving the Problem

The summary of the present invention is as follows.

(1) According to one aspect of the present invention, there is provided a method of manufacturing a laminated core by punching electrical steel strips including an insulation coating to obtain core single sheets and laminating the core single sheets, the method including:

pressurizing two or more electrical steel strips using a guide roller to temporarily bond the electrical steel strips immediately before the punching; and obtaining the core single sheets by performing the punching after inserting the two or more electrical steel strips after the temporary bonding into a punching die.

(2) In the method of manufacturing a laminated core according to (1), a surface temperature of the two or more electrical steel strips during the temporary bonding may be 15° C. to 50° C.

(3) In the method of manufacturing a laminated core according to (1) or (2), an applied pressure during the pressurization by the guide roller may be 2.0 to 10.0 MPa.

(4) In the method of manufacturing a laminated core according to any one of (1) to (3), after the punching, the core single sheets may be heated to 180° C. to 250° C. to mainly bond the core single sheets.

(5) In the method of manufacturing a laminated core according to any one of (1) to (4), the insulation coating may have adhesiveness.

Effects of the Invention

In the above-described aspect according to the present invention, a method of manufacturing a laminated core having excellent productivity can be provided.

EMBODIMENTS OF THE INVENTION

Hereinafter, a method of manufacturing a laminated core according to one embodiment of the present invention will be described with reference to the drawings. First, a laminated core manufactured using the method of manufacturing a laminated core according to the embodiment, a rotating electrical machine including the laminated core, and a material for forming the laminated core will be described. In the embodiment, an electric motor, specifically an AC motor, more specifically a synchronous motor, and still more preferably a permanent magnet motor will be described as an example of the rotating electrical machine. As this electric motor, for example, an electric vehicle is suitably adopted.

(Rotating Electrical Machine 10)

Figure 1:
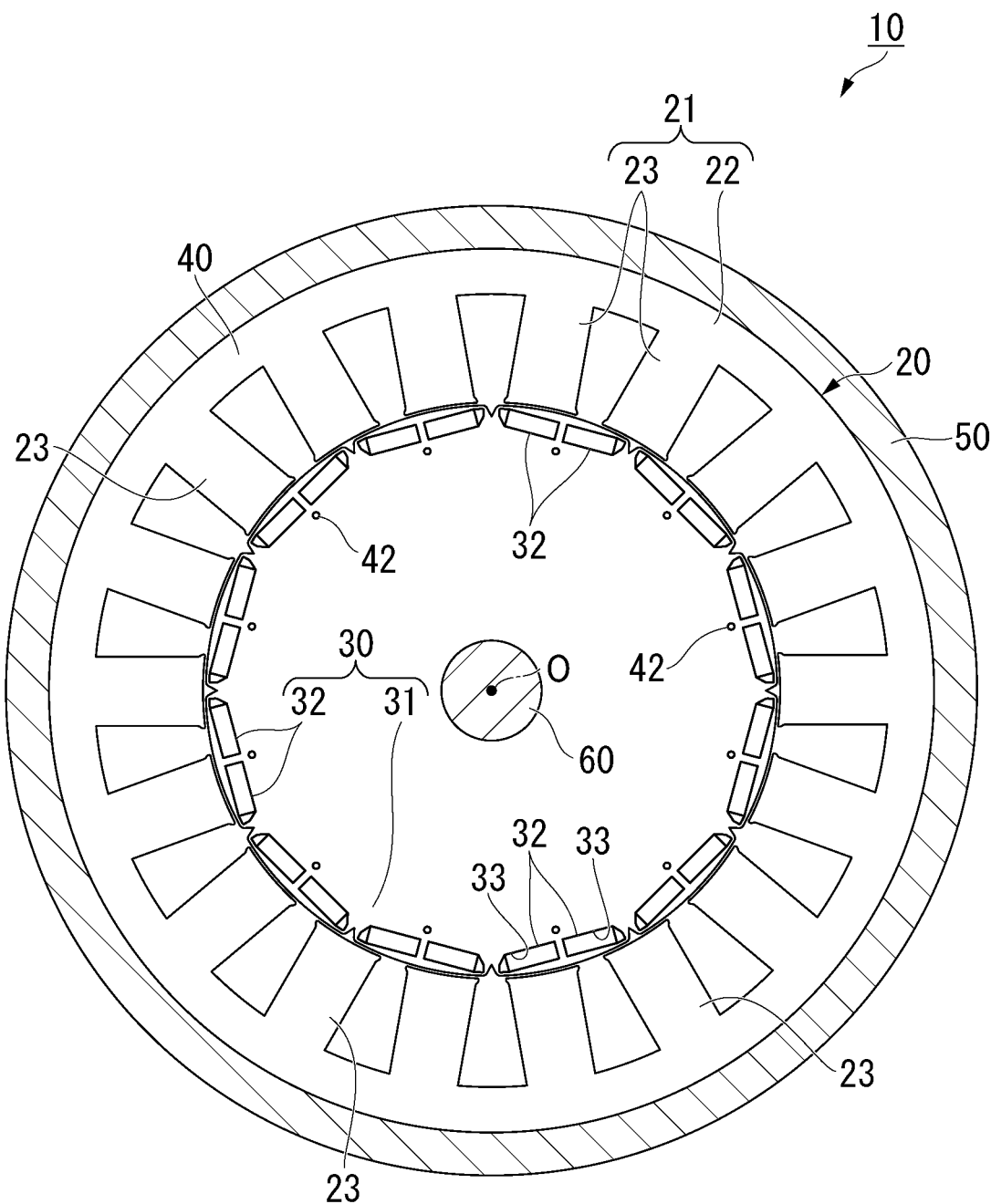
FIG. 1 is a cross-sectional view showing a rotating electrical machine including a laminated core.

As shown in FIG. 1, the rotating electrical machine 10 includes a stator 20, a rotor 30, a case 50, and a rotating shaft 60. The stator 20 and the rotor 30 are housed in the case 50. The stator 20 is fixed to the inside of the case 50.

In the embodiment, an inner rotor type where the rotor 30 is positioned inward in a radial direction of the stator 20 is adopted as the rotating electrical machine 10. However, an outer rotor type where the rotor 30 is positioned outside the stator 20 may be adopted as the rotating electrical machine 10. In addition, in the embodiment, the rotating electrical machine 10 is a 12-pole 18-slot three-phase AC motor. However, the number of poles, the number of slots, the number of phases, and the like can be appropriately changed.

For example, when an excitation current having an effective value of 10 A and a frequency of 100 Hz is applied at each of the phases, the rotating electrical machine 10 can rotate at a rotation speed of 1000 rpm.

The stator 20 includes a laminated core for bonding a stator (hereinafter, stator core) 21 and a winding (not shown).

The stator core 21 includes an annular core back portion 22 and a plurality of tooth portions 23. Hereinafter, a central axis O direction of the stator core 21 (or the core back portion 22) will be referred to as the axial direction, a radial direction (direction perpendicular to the central axis O) of the stator core 21 (or the core back portion 22) will be referred to as the radial direction, and a circumferential direction (direction around the central axis O) of the stator core 21 (or the core back portion 22) will be referred to as the circumferential direction.

The core back portion 22 is formed in a tonic shape in a plan view when the stator 20 is seen from the axial direction.

The plurality of tooth portions 23 protrude inward in the radial direction (toward the central axis O of the core back portion 22 in the radial direction) from an inner circumference of the core back portion 22. The plurality of tooth portions 23 are disposed at regular angular intervals in the circumferential direction. In the embodiment, 18 tooth portions 23 are provided at intervals of a central angle of 20 degrees around the central axis O. The plurality of tooth portions 23 are formed in the same shape and the same size. Accordingly, the plurality of tooth portions 23 have the same thickness.

The winding is coiled around the tooth portions 23. The winding may be in a concentrated winding state or in a distributed winding state.

The rotor 30 is disposed inward in the radial direction with respect to the stator 20 (stator core 21). The rotor 30 includes a rotor core 31 and a plurality of permanent magnets 32.

The rotor core 31 is formed in an annular (toric) shape that is disposed on the same axis as the stator 20. In the rotor core 31, the rotating shaft 60 is disposed. The rotating shaft 60 is fixed to the rotor core 31.

The plurality of permanent magnets 32 are fixed to the rotor core 31 In the embodiment, one set including two permanent magnets 32 forms one magnetic pole. Plural sets of permanent magnets 32 are disposed at regular angular intervals in the circumferential direction. In the embodiment, 12 sets of permanent magnets 32 (24 permanent magnets 32 in total) are provided at intervals of a central angle of 30 degrees around the central axis O.

In the embodiment, an embedded magnet motor is adopted as the permanent magnet motor. In the rotor core 31, a plurality of through-holes 33 that penetrate the rotor core 31 in the axial direction are formed. The plurality of through-holes 33 are provided corresponding to the arrangement of the plurality of permanent magnets 32. Each of the permanent magnets 32 is fixed to the rotor core 31 in a state where it is disposed in the corresponding through-hole 33. The fixing of the rotor core 31 to each of the permanent magnets 32 can be realized for example, by bonding an outer surface of the permanent magnet 32 and an inner surface of the through-hole 33 using an adhesive. As the permanent magnet motor, a surface magnet motor may be adopted instead of the embedded magnet type.

Figure 2:
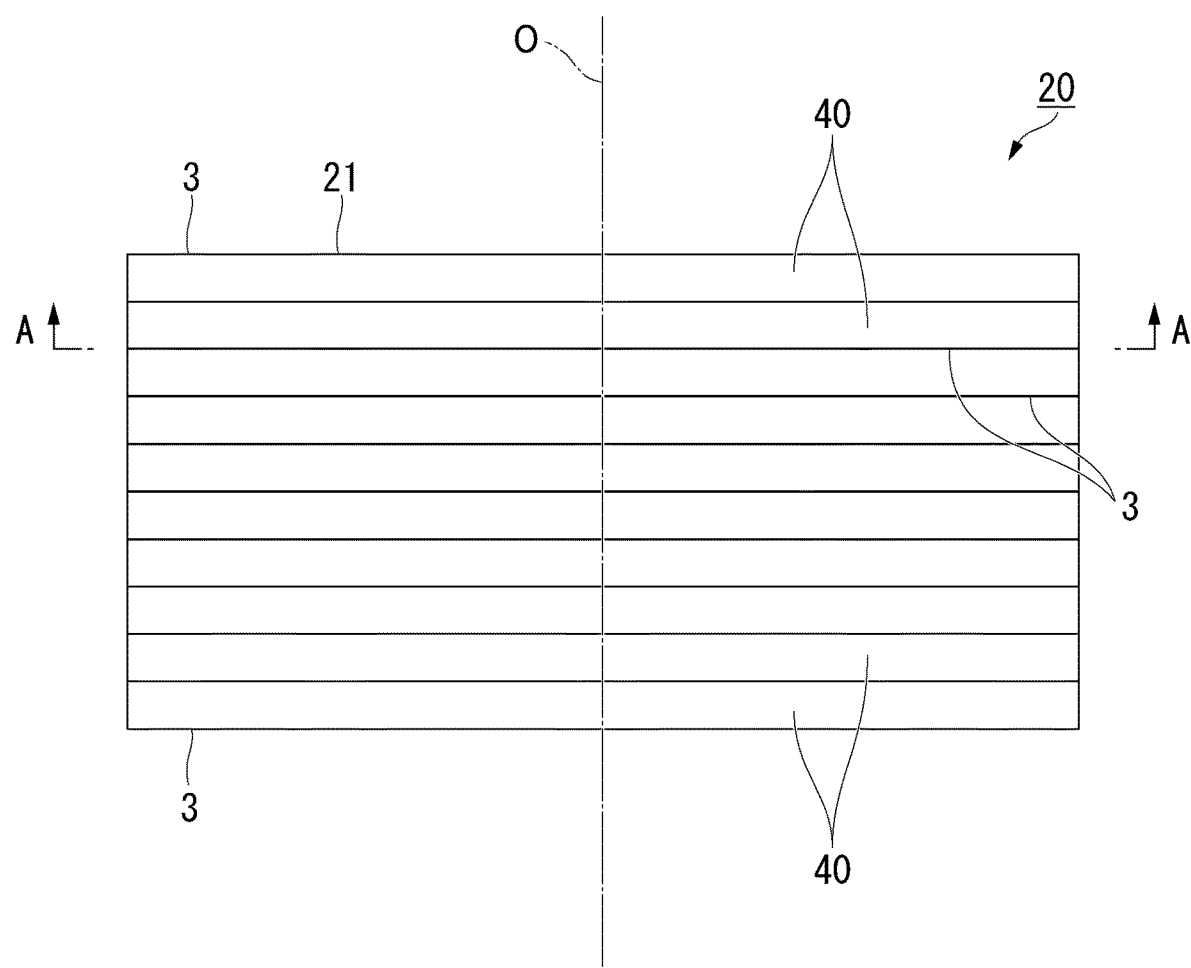
FIG. 2 is a side view showing the laminated core.

Both of the stator core 21 and the rotor core 31 are the laminated cores. For example, as shown in FIG. 2, the stator core 21 is formed by laminating a plurality of core single sheets 40 in a laminating direction.

The lamination thickness (overall length along the central axis O) of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. These values are exemplary, and the lamination thickness and the outer diameter Or inner diameter of the stator core 21 and the lamination thickness and the outer diameter or inner diameter of the rotor core 31 are not limited to only these values. Here, the inner diameter of the stator core 21 is based on tip end portions of the tooth portions 23 in the stator core 21. That is, the inner diameter of the stator core 21 is the diameter of an imaginary circle inscribed in the tip end portions of all of the tooth portions 23.

Figure 4:
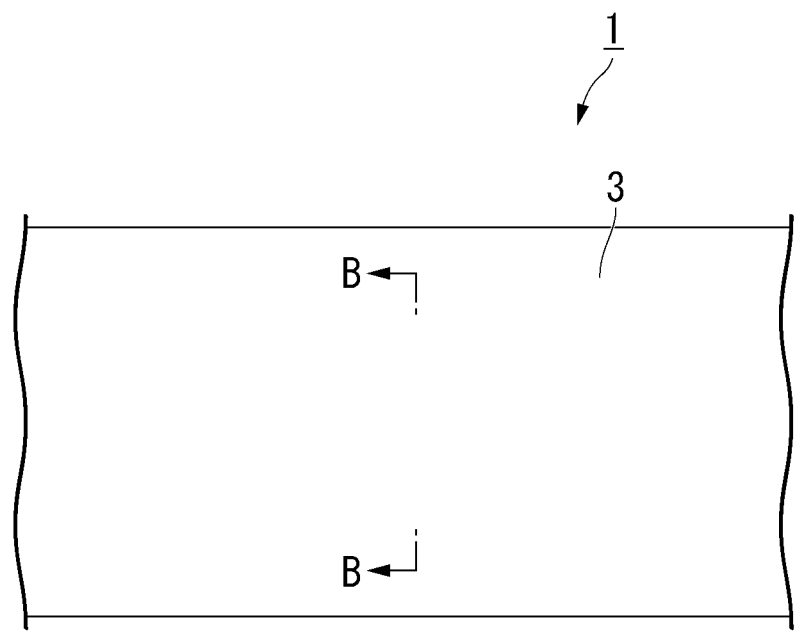
FIG. 4 is a plan view showing a material for forming the laminated core.
Figure 5:
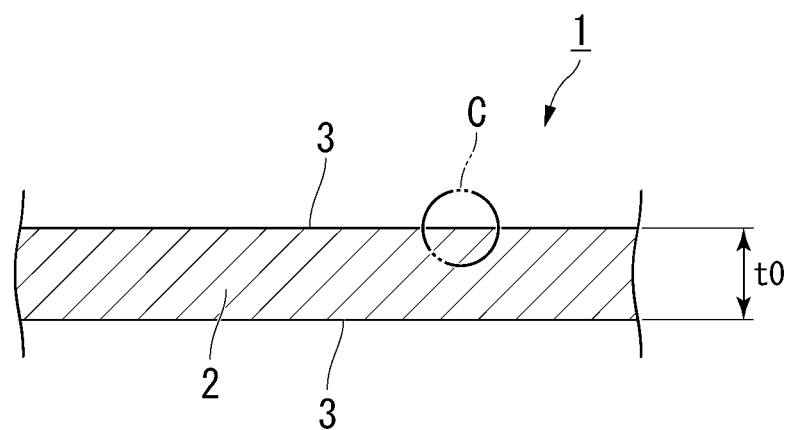
FIG. 5 is a B-B cross-sectional view of FIG. 4.
Figure 6:
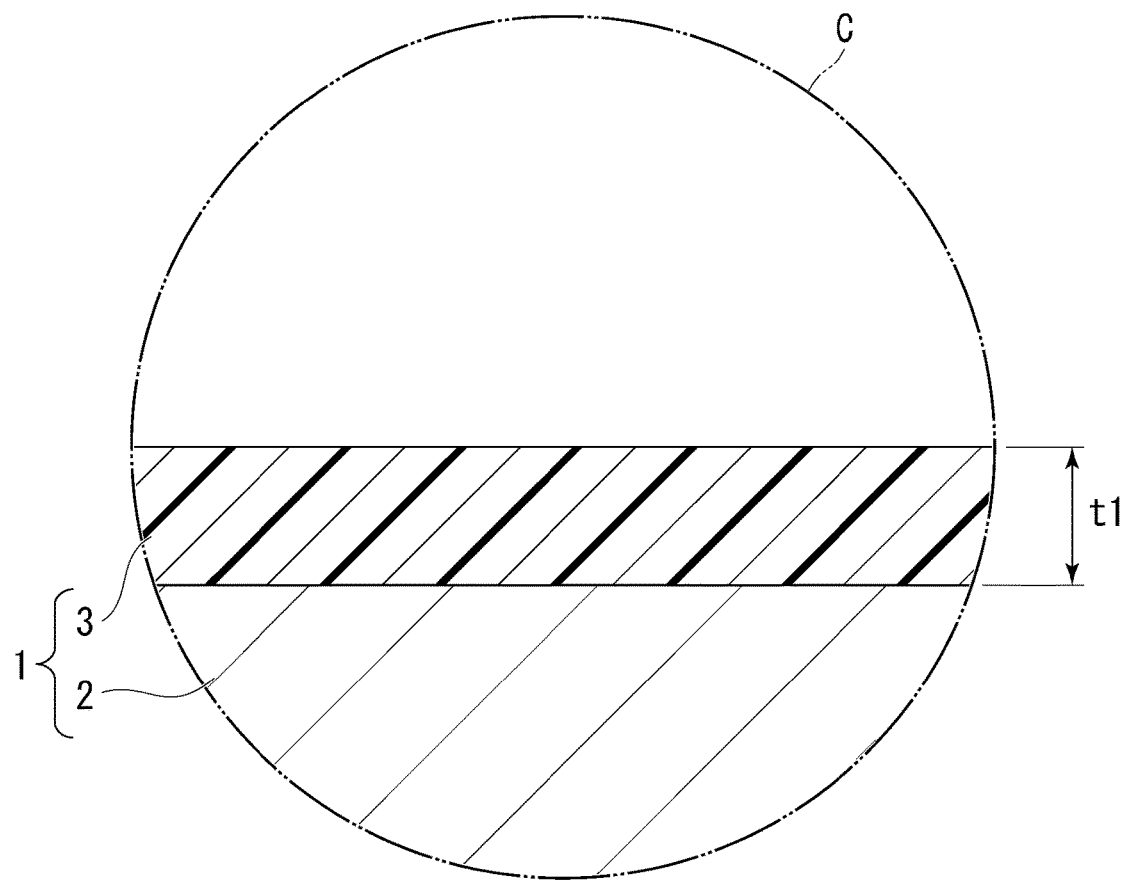
FIG. 6 is an enlarged view showing a C portion of FIG. 5.

Each of the core single sheets 40 that form the stator core 21 and the rotor core 31 is formed, for example, by punching a material 1 shown in FIGS. 4 to 6. The material 1 is a steel sheet (electrical steel sheet) as a base metal of the core single sheet 40. Examples of the material 1 include a strip-shaped steel sheet or a cut sheet.

Although the description of the laminated core is ongoing, the material 1 will be described below. In the present specification, the strip-shaped steel sheet as the base metal of the core single sheet 40 will also be referred to as the material 1 or the electrical steel strip 1. A steel sheet obtained by punching the material 1 or the electrical steel strip 1 in a shape used for the laminated core will also be referred to as the core single sheet 40.

(Material 1)

The material 1 is handled, for example, in a state where it is coiled around a coil 1A. In the embodiment, a non-oriented electrical steel sheet is adopted as the material 1. A non-oriented electrical steel strip of JIS C 2552:2014 is adopted as the non-oriented electrical steel sheet. However, a grain-oriented electrical steel sheet may be adopted as the material 1 instead of the non-oriented electrical steel sheet. In this case, a grain-oriented electrical steel strip of JIS C 2553:2019 is adopted as the grain-oriented electrical steel sheet. In addition, a non-oriented thin electrical steel strip and a grain-oriented thin electrical steel strip of JIS C 2558:2015 can be adopted.

Upper and lower limits of an average sheet thickness t0 of the material 1 are set, for example as follows in consideration that the material 1 is used as the core single sheet 40.

As the sheet thickness of the material 1 decreases, the manufacturing cost of the material 1 increases. Therefore, in consideration of the manufacturing cost, the lower limit of the average sheet thickness t0 of the material 1 is 0.10 mm, preferably 0.15 mm, and more preferably 0.18 mm.

On the other hand, when the thickness of the material 1 is excessively large, the manufacturing cost is improved. When the material 1 is used as the core single sheet 40, the eddy-current loss increases, and core iron loss deteriorates. Therefore, in consideration of the core iron loss and the manufacturing cost, the upper limit of the average sheet thickness t0 of the material 1 is 0.65 mm, preferably 0.35 mm, and more preferably 0.30 mm.

The average sheet thickness t0 of the material 1 that satisfies the above-described range is, for example, 0.20 mm.

The average sheet thickness t0 of the material 1 includes not only the thickness of a base steel sheet 2 described but also the thickness of an insulation coating 3. In addition, a method of measuring the average sheet thickness to of the material 1 is, for example, the following measurement method. For example, when the material 1 is coiled in a shape of the coil 1A, at least a part of the material 1 is uncoiled in a flat shape. In the material 1 that is uncoiled in a flat shape, a predetermined position of the material 1 in a longitudinal direction (for example, a position distant from an end edge of the material 1 in the longitudinal direction by a length corresponding to 10% of the overall length of the material 1) is selected. At this selected position, the material 1 is divided into five regions in a width direction thereof. At four portions as boundaries of the five regions, the sheet thickness of the material 1 is measured. The average value of the sheet thicknesses at the four portions can be obtained as the average sheet thickness t0 of the material 1.

Of course, the upper and lower limits of the average sheet thickness t0 of the material 1 can also be adopted as upper and lower limits of the average sheet thickness t0 as the core single sheet 40. A method of measuring the average sheet thickness t0 of the core single sheet 40 is, for example, the following measurement method. For example, the lamination thickness of the laminated core is measured at four portions at regular intervals in the circumferential direction (that is, at intervals of 90 degrees around the central axis O). Each of the measured lamination thicknesses at the four portions is divided by the number of the laminated core single sheets 40 to calculate the sheet thickness per sheet. The average value of the sheet thicknesses at the four portions can be obtained as the average sheet thickness t0 of the core single sheet 40.

As shown in FIGS. 5 and 6, the material 1 includes the base steel sheet 2 and the insulation coating 3. In the material 1, both surfaces of the strip-shaped base steel sheet 2 are covered with the insulation coating 3. In the embodiment, most of the material 1 is formed of the base steel sheet 2, and the insulation coating 3 that is thinner than the base steel sheet 2 is formed on the surface of the base steel sheet 2.

The chemical composition of the base steel sheet 2 includes 2.5% to 4.5% of Si by mass % as represented by mass % below. By adjusting the chemical composition to be in this range, the yield strength of the material 1 (core single sheet 40) can be set to be, for example, 380 to 540 MPa.

Si: 2.5% to 4.5%
Al: 0.001% to 3.0%
Mn: 0.05% to 5.0%
Remainder: Fe and Impurities When the material 1 is used as the core single sheet 40, the insulation coating 3 exhibits insulation properties between the core single sheets 40 adjacent to each other in the laminating direction. In addition, in the embodiment, the insulation coating 3 has adhesiveness such that the core single sheets 40 adjacent to each other in the laminating direction are bonded to each other. The insulation coating 3 may have a single layer configuration or a multilayer configuration. More specifically, for example, the insulation coating 3 may have a single layer configuration having insulation properties and adhesiveness or may have a multilayer configuration that includes an underlayer insulation coating having excellent insulation properties and an upper layer insulation coating having excellent adhesiveness.

In the embodiment, the insulation coating 3 covers the entire surface of both surfaces of the base steel sheet 2 without a gap. However, within a range where the insulation properties or the adhesiveness are secured, a part of the insulation coating 3 does not need to cover both surfaces of the base steel sheet 2 without a gap. In other words, a part of the insulation coating 3 may be intermittently provided on the surfaces of the base steel sheet 2. However, in order to secure the insulation properties, both surfaces of the base steel sheet 2 need to be covered with the insulation coating 3 such that the entire surface is not exposed. Specifically, when the insulation coating 3 has the single layer configuration having not only insulation properties but also adhesiveness without including the underlayer insulation coating having excellent insulation properties, the insulation coating 3 needs to be formed over the entire surface of the base steel sheet 2 without a gap. On the other hand, when the insulation coating 3 has the multilayer configuration that includes an underlayer insulation coating having excellent insulation properties and an upper layer insulation coating having excellent adhesiveness, both of the underlayer insulation coating and the upper layer insulation coating are formed on the entire surface of the base steel sheet 2 without a gap. In addition, even if the underlayer insulation coating is formed on the entire surface of the base steel sheet without a gap and the upper layer insulation coating is intermittently provided, both of insulation properties and adhesiveness can be achieved at the same time.

A coating composition for forming the underlayer insulation coating is not particularly limited. For example, a general treatment agent such as a chromic acid-containing treatment agent or a phosphate-containing treatment can be used.

The insulation coating having adhesiveness is formed by coating the base steel sheet with a coating composition for an electrical steel sheet described below. The insulation coating having adhesiveness is the insulation coating that has the single layer configuration having not only insulation properties but also adhesiveness or the upper layer insulation coating that is formed on the underlayer insulation coating. The insulation coating having adhesiveness is in an uncured state or a semi-cured state (B stage) before heating pressurization for manufacturing the laminated core, and exhibits adhesiveness when the curing reaction progresses by heating during the heating pressurization.

A typical insulating film has insulation properties but does not have adhesiveness. As described above the insulating film according to the embodiment is largely different from the typical insulation coating and an adhesive layer formed of an adhesive in that it has adhesiveness and insulation properties.

In addition, as a method of bonding the base steel sheets 2 on which the insulation coating not having adhesiveness is formed, a method of bonding the base steel sheets 2 using an adhesive formed of a thermosetting resin having adhesiveness can be used. In the core single sheet 40 that is manufactured by bonding the base steel sheets 2 using this method, two or more base steel sheets 2 are bonded before punching. Therefore, although the base steel sheets 2 in the core single sheet 40 are bonded, the two or more core single sheets 40 in the bonded state are not bonded to each other. Therefore, a process of separately applying an adhesive to any one of front and rear surfaces of the core single sheets 40 is necessary, and the productivity deteriorates. When an adhesive is further used for the insulation coating having adhesiveness and insulation properties, the space factor decreases, and thus a laminated core having poor magnetic characteristics is obtained.

The coating composition for an electrical steel sheet is not particularly limited, and examples thereof include a composition including an epoxy resin and an epoxy resin curing agent. That is, examples of the insulation coating having adhesiveness include a film including an epoxy resin and an epoxy resin curing agent.

As the epoxy resin, a general epoxy resin can be used. Specifically, any epoxy resin having two or more epoxy groups in one molecule can be used without any particular limitation. Examples of the epoxy resin include a bisphenol A epoxy resin, a bisphenol F epoxy resin, a phenol novolac epoxy resin, a cresol novolac epoxy resin, an alicyclic epoxy resin, a glycidyl ester epoxy resin, a glycidylamine epoxy resin, a hydantoin epoxy resin, an isocyanurate epoxy resin, an acrylic acid-modified epoxy resin (epoxy acrylate), a phosphorus-containing epoxy resin, and a halide (brominated epoxy resin) or a hydrogenated product thereof. The epoxy resins may be used alone or in combination of two or more kinds.

The coating composition for an electrical steel sheet may include an acrylic resin.

The acrylic resin is not particularly limited. Examples of a monomer used for the acrylic resin include an unsaturated carboxylic acid such as acrylic acid or methacrylic acid and a (meth)acrylate such as methyl (meth)acrylate, ethyl (meth)acrylate, n-butyl (meth)acrylate, isobutyl (meth)acrylate, cyclohexyl (meth)acrylate, 2-ethylhexyl (meth)acrylate, 2-hydroxyethyl (meth)acrylate, or hydroxypropyl (meth)acrylate. The (meth)acrylate refers acrylate or methacrylate. The acrylic resins may be used alone or in combination of two or more kinds.

The acrylic resin may include a constituent unit derived from another monomer other than the acrylic monomer. Examples of the other monomer include ethylene, propylene, and styrene. The other monomers may be used alone or in combination of two or more kinds.

When an acrylic resin is used, the other monomer is used for an acrylic modified epoxy resin in which an acrylic resin is grafted with an epoxy resin. The coating composition for an electrical steel sheet may include the other monomer as a monomer for forming an acrylic resin.

As the epoxy resin curing agent, a thermally curable curing agent having latency can be used, and examples thereof include an aromatic polyamine, an acid anhydride, a phenol, curing agent, a dicyandiamide, a boron trifluoride-amine complex, and an organic acid hydrazide. Examples of the aromatic polyamine include meta-phenylenediamine, diaminodiphenyl methane, and diaminodiphenyl sulfone. Examples of the phenol curing agent include a phenol novolac resin, a cresol novolac resin, a bisphenol novolac resin, a triazine-modified phenol novolac resin, and a phenol resole resin. In particular, as the epoxy resin curing agent, a phenol curing agent is preferable, and a phenol resole resin is more preferable. The epoxy resin curing agents may be used alone or in combination of two or more kinds.

The content of the epoxy resin curing agent in the coating composition for an electrical steel sheet is preferably 5 to 35 parts by mass and more preferably 10 to 30 parts by mass with respect to 100 parts by mass of the epoxy resin.

In the coating composition for an electrical steel sheet, an additive such as a curing accelerator (curing catalyst), an emulsifier, or an antifoaming agent may be mixed. The additives may be used alone or in combination of two or more kinds.

Upper and lower limits of an average thickness t1 of the insulation coating 3 are set, for example as follows in consideration that the material 1 is used as the core single sheet 40. When the material 1 is used as the core single sheet 40, the average thickness t1 of the insulation coating 3 (the thickness per single surface of the core single sheet 40 (material 1)) is adjusted such that the insulation properties and the adhesiveness of the laminated core single sheets 40 can be secured.

In the insulation coating 3 having the single layer configuration, the average thickness t1 of the insulation coating 3 (the thickness per single surface of the core single sheet 40 (material 1)) can be, for example, 1.5 µm or more and 8.0 µm or less.

In the insulation coating 3 having the multilayer configuration, the average thickness of the underlayer insulation coating can be, for example, 0.3 µm or more and 1.2 µm or less and is preferably 0.7 µm or more and 0.9 µm or less. The average thickness of the upper layer insulation coating can be, for example, 1.5 µm or more and 8.0 µm or less.

As a method of measuring the average thickness t1 of the insulation coating 3 in the material 1, the average thickness t1 can be obtained by obtaining the thicknesses of the insulation coating 3 at a plurality of positions and obtaining the average value of the thicknesses as in the average sheet thickness to of the material 1.

Of course, the upper and lower limits of the average thickness t1 of the insulation coating 3 in the material 1 can also be adopted as upper and lower limits of the average thickness t1 of the insulation coating 3 as the core single sheet 40. A method of measuring the average thickness t1 of the insulation coating 3 in the core single sheet 40 is, for example, the following measurement method. For example, among the plurality of core single sheets 40 forming the laminated core, the core single sheet 40 that is positioned on the outermost side in the laminating direction (the core single sheet 40 having a surface that is exposed in the laminating direction) is selected. On the surface of the selected core single sheet 40, a predetermined position in the radial direction (for example, a position at the exact center of an inner circumference and an outer circumference of the core single sheet 40) is selected. At the selected position, the thickness of the insulation coating 3 in the core single sheet 40 is measured at four portions at regular intervals in the circumferential direction (that is, at intervals of 90 degrees around the central axis O). The average value of the measured thicknesses at the four portions can be obtained as the average thickness t1 of the insulation coating 3.

The reason for measuring the average thickness t1 of the insulation coating 3 in the core single sheet 40 that is positioned on the outermost side in the laminating direction is that the insulation coating 3 is formed such that the thickness of the insulation coating 3 does not substantially change depending on lamination positions in the laminating direction of the core single sheets 40.

By punching the material 1, the core single sheet 40 is manufactured, and the laminated core (stator core 21 or the rotor core 31) is manufactured using the core single sheet 40.

(Laminating Method of Laminated Core)

Figure 3:
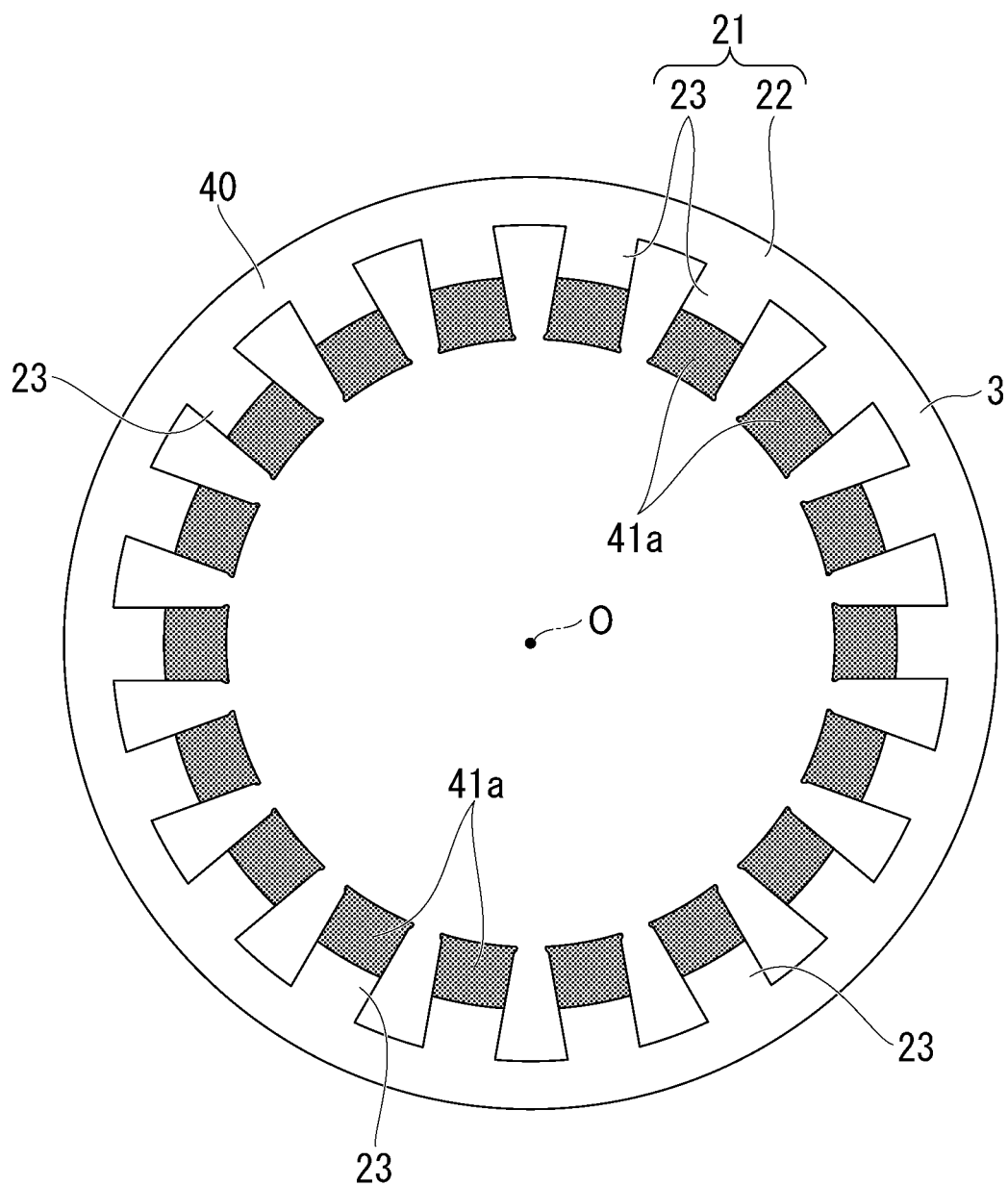
FIG. 3 is an A-A cross-sectional view of FIG. 2.

Hereinafter, the laminated core will be described again. A plurality of core single sheets 40 forming the stator core 21 are laminated through the insulation coating 3 as shown in FIG. 3.

The core single sheets 40 adjacent to each other in the laminating direction are bonded over the entire surface using the insulation coating 3. In other words, a surface (hereinafter, referred to as "first surface") of the core single sheet 40 facing the laminating direction is a bonding region over the entire surface. In this case, the core single sheets 40 adjacent to each other in the laminating direction do not need to be bonded over the entire surface. In other words, on the first surface of the core single sheet 40, a bonding region 41a and a non-bonding region (not shown) may be mixed.

In the embodiment, a plurality of core single sheets forming the rotor core 31 are fixed to each other using a fastener 42 (dowel) shown in FIG. 1. However, a plurality of core single sheets forming the rotor core 31 may also have a laminate structure in which they are fixed using the insulation coating 3 as in the stator core 21.

In addition, the laminated core such as the stator core 21 or the rotor core 31 may be formed by so-called rotation lamination.

(Method of Manufacturing Laminated Core)

Figure 7:
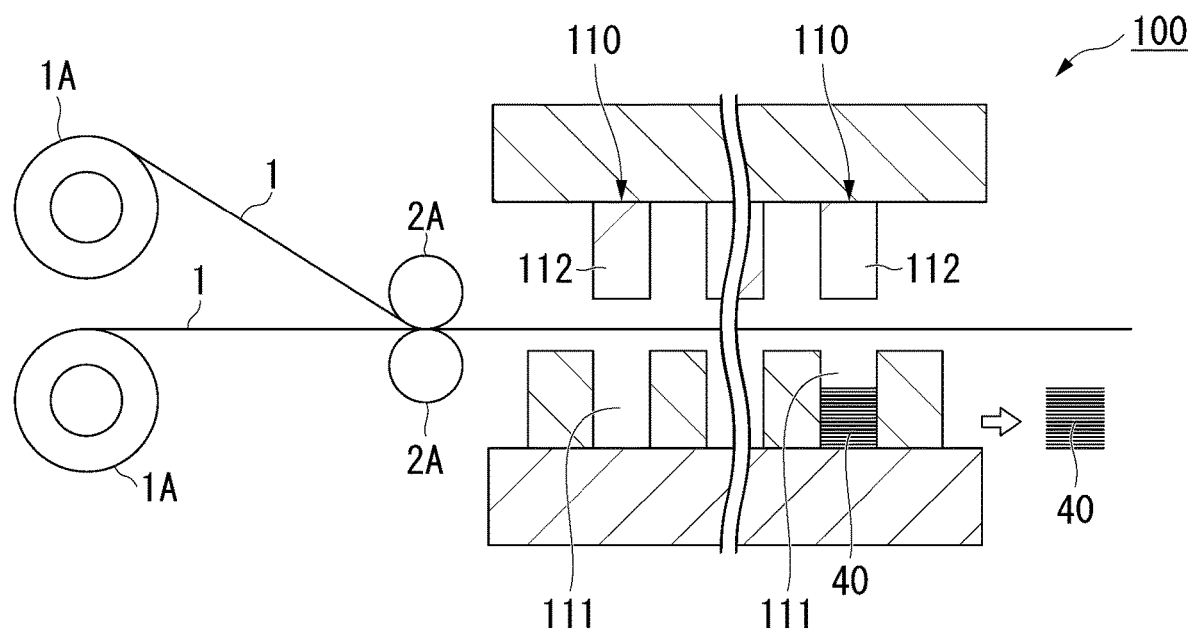
FIG. 7 is a side view showing a manufacturing device used for manufacturing the laminated core.
Figure 8:
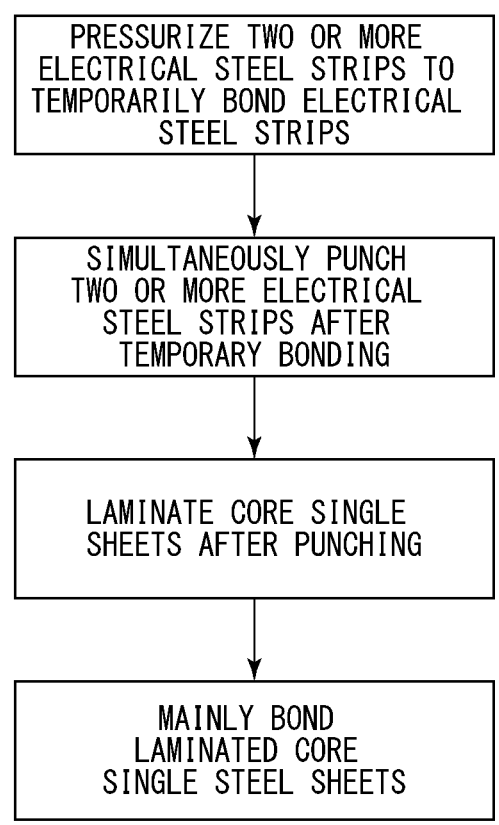
FIG. 8 is a flowchart showing a method of manufacturing the laminated core according to the embodiment.

Hereinafter, a method of manufacturing a laminated core according to one embodiment of the present invention will be described with reference to FIGS. 7 and 8. FIG. 7 is a side view showing a manufacturing device used for manufacturing the laminated core. FIG. 8 is a flowchart showing the method of manufacturing the laminated core according to the embodiment. Hereinafter, in the description of the manufacturing method, first, a manufacturing device 100 for manufacturing the laminated core (hereinafter, simply referred to as "manufacturing device 100") will be described.

In the manufacturing device 100, two materials 1 are temporarily bonded using a guide roller 2A while feeding the materials 1 from two coils 1A (hoops) to the upstream side (the right side in FIG. 7) in a conveyance direction. Next, while further feeding the two materials 1 that are temporarily bonded to the upstream side in the conveyance direction, the materials 1 are punched multiple times using a die disposed at each of stages, and thus are gradually formed in a shape of the core single sheet 40. The punched core single sheets 40 are laminated, are conveyed to a heating device (not shown), and are pressurized while being heated. As a result, the core single sheets 40 adjacent to each other in the laminating direction are bonded using the insulation coating 3 (that is, a portion of the insulation coating 3 that is positioned in the bonding region 41a is caused to exhibit adhesiveness), and thus main bonding is completed.

In FIG. 7, the manufacturing device 100 includes the two coils 1A. However, the manufacturing device 100 may include three or more coils 1A.

In addition, the manufacturing device 100 includes plural stages of punching stations 110. The punching stations 110 may be two stages or may be three or more stages. The punching station 110 on each of the stages includes: a female die 111 that is disposed below the material 1; and a male die 112 that is disposed above the material 1. The plural stages of punching stations 110 will also be collectively referred to as "punching die".

The method of manufacturing the laminated core according to the embodiment is a method of manufacturing a laminated core by punching electrical steel strips including an insulation coating to obtain core single sheets and laminating the core single sheets, the method including: pressurizing two or more electrical steel strips using a guide roller to temporarily bond the electrical steel strips immediately before the punching; and obtaining the core single sheets by performing the punching after inserting the two or more electrical steel strips after the temporary bonding into a punching die.

Hereinafter, the details will be described.

(Temporary Bonding by Pressurization)

First, two or more materials 1 (electrical steel strips) are pressurized using the guide roller 2A to temporarily bond the materials 1 immediately before the punching by the punching die. The materials 1 that are temporarily bonded include the insulation coating 3 on both surfaces thereof. It is preferable that the insulation coating 3 is formed such that the average thickness t1 is in the above-described range. In addition, as described above, the insulation coating 3 has insulation properties and adhesiveness.

The guide roller 2A is a roller for conveying the materials 1 to the punching die and is disposed on the upstream side (the left side in FIG. 7) in the conveyance direction of the punching die. In addition, "immediately before the punching" represents that any treatment is not performed before the punching after the temporary bonding.

In the embodiment, the temporary bonding represents that the two or more materials 1 before punching are pressurized and bonded without being heated. "After the temporary bonding" represents a state where the materials are temporarily bonded. The two or more materials 1 that are temporarily bonded are heated as described below to mainly bond the materials 1 after the punching.

In the embodiment, when the two or more materials 1 are bonded, an adhesive is not used. When the materials are bonded using an adhesive instead of the temporary bonding by the pressurization, the space factor decreases. Therefore, a laminated core having poor magnetic characteristics is obtained. Therefore, it is not desirable to use an adhesive.

As described above, in the embodiment, the two or more materials 1 do not need to be heated during the temporary bonding. In order to heat the materials 1 during the temporary bonding, a heating device is necessary, and a long period of time is required for heating the materials 1. Therefore, the productivity significantly deteriorates. The surface temperature of the two or more materials 1 during the temporary bonding only has to be a normal temperature and may be, for example, 15° C. to 50° C. The surface temperature of the materials 1 can be obtained by measuring the temperatures of center portions of the two or more materials 1 in the width direction during the temporary bonding using an infrared radiation-type thermometer and calculating the average value of the measured temperatures.

The applied pressure by the guide roller 2A during the temporary bonding is preferably 2.0 to 10.0 MPa. By adjusting the applied pressure to be in the above-described range, the two or more materials 1 can be temporarily bonded with reliability.

Whether or not the two or more materials 1 are temporarily bonded is determined using the following method. A test piece having a predetermined size is collected, and this test piece is provided for a tensile test (a shear tensile test defined by JIS K 6850:1999). When the peeling strength per unit area obtained using the tensile test is 5 N/cm$^2$ or higher, it is determined that the two or more materials 1 are temporarily bonded.

(Punching)

The two or more materials 1 that are temporarily bonded are gradually punched in a desired shape using the guide roller 2A after inserting the materials 1 into the punching die (the plural stages of punching stations 110 in FIG. 7). The desired shape refers to, for example, the shape of the core single sheet 40 having the shape of the stator core 21 or the rotor core 31. The core single sheets 40 that are punched in the desired shape are laminated in the female die 111 positioned on the most downstream side of the punching die.

By sequentially repeating the punching and the lamination described above, a predetermined number of core single sheets 40 are laminated.

(Main Bonding)

The laminated core single sheets 40 are conveyed to a heating device (not shown) and are heated to a temperature range of, for example, 180° C. to 250° C. by the heating device to mainly bond the core single sheets 40. Due to this heating, an adhesive (insulation coating 3) is cured to form the bonding region 41a. When conveyed to the heating device, the laminated core single sheets 40 may be conveyed in a state where they are interposed and held from both sides in the laminating direction using a jig (not shown).

Using the above-described method, the laminated core can be manufactured.

In the embodiment, whether or not the core single sheets 40 are mainly bonded is determined by performing a shear tensile test using the same method as that of the determination of the temporary bonding. When the peeling strength is 250 N/cm$^2$ or higher, it is determined that the core single sheets 40 are mainly bonded.

EXAMPLES

Example 1

As one aspect of the present invention, two coils of non-oriented electrical steel strips having a sheet thickness of 0.20 mm were prepared, the non-oriented electrical steel strips having a surface on which an insulation coating was formed and being processed into a predetermined slit width. As the non-oriented electrical steel strip, a steel strip including, by mass %, Si: 3.3%, Al: 0.7%, Mn: 0.2%, and the remainder consisting of Fe and impurities was used. As the insulation coating, a single-layer insulation coating having insulation properties and adhesiveness was used. The average thickness of the insulation coating per single surface of the core single sheet was 1.5 μm or more and 8.0 μm or less. Two non-oriented electrical steel strips were pressurized using a guide roller to temporarily bond the non-oriented electrical steel strips. The applied pressure of the guide roller was 2.0 to 10.0 MPa, and the surface temperature of the non-oriented electrical steel strips during the temporary bonding was 15° C. to 50° C. When the two non-oriented electrical steel strips after the temporary bonding were provided for a shear tensile test defined by JIS K 6850:1999, the obtained peeling strength per unit area was 5 N/cm$^2$ or higher.

Next, the non-oriented electrical steel strips after the temporary bonding were inserted into a punching die and were punched in a predetermined core single sheet shape while maintaining the temporarily bonded state. By repeating this operation in synchronization, the core single sheets were laminated in the female die positioned on the most downstream side of the punching die. The laminated core single sheets were conveyed to a heating device and were heated to 180° C. to 250° C. to mainly bond the core single sheets. When the two non-oriented electrical steel sheets after the main bonding are provided for a shear tensile test defined by JIS K 6850:1999, the obtained peeling strength per unit area was 250 N/cm$^2$ or higher.

In the non-oriented electrical steel strip, the insulation coating having adhesiveness was formed. Therefore, by heating the core single sheets laminated in the female die using the heating device, a laminated core that was mainly bonded was obtained.

Example 2

A non-oriented electrical steel strip having a surface on which an insulation coating was formed and having a sheet thickness of 0.20 mm was prepared, the non-oriented electrical steel strip including, by mass %, Si: 3.3%, Al: 0.7%, Mn: 0.2%, and the remainder consisting of Fe and impurities. Regarding the insulation coating, a chromic acid-containing treatment agent was used as a coating composition for forming an underlayer insulation coating, and an insulation coating having insulation properties and adhesiveness was formed as an upper layer insulation coating provided on the underlayer insulation coating. In the insulation coating, the average thickness of the underlayer insulation coating was 0.3 μm or more and 1.2 μm or less, and the average thickness of the upper layer insulation coating was 1.5 μm or more and 8.0 μm or less. The non-oriented electrical steel strip was cut into 25 min×200 mm, the cut portions were made to overlap in an area of 25 mm×25 mm, and the overlapping portion was pressurized at various applied pressures shown in Table 1. Next, the non-oriented electrical steel strip was provided for a shear tensile test defined by JIS K 6850:1999 in a direction in which the overlapping portion was sheared at a testing rate of 3 mm/min.

TABLE 1

| Test No. | Applied Pressure (MPa) | Peeling Strength (N/cm$^2$) |
| --- | --- | --- |
| 1 | 0.5 | — |
| 2 | 1.5 | 3.1 |
| 3 | 2.1 | 5.1 |
| 4 | 3.2 | 7.5 |
| 5 | 5.5 | 8.1 |
| 6 | 9.5 | 8.5 |

In Test Nos. 1 and 2 where the applied pressure was low, a sufficient peeling strength was not obtained, and the temporarily bonded state was not able to be realized. On the other hand, in Test Nos. 3 to 6, the applied pressure was in an appropriate range. Therefore, the peeling strength was in an appropriate range, and an excellent temporarily bonded state was realized.

Example 3

Two coils of non-oriented electrical steel strips having a sheet thickness of 0.20 mm were prepared, the non-oriented electrical steel strips being processed into a predetermined slit width. As the non-oriented electrical steel strip, a steel strip including, by mass %, Si: 3.3%, Al: 0.7%, Mn: 0.2%, and the remainder consisting of Fe and impurities was used.

In Nos. 7 and 9, an insulation coating was formed on a surface. As the insulation coating, a single-layer insulation coating having insulation properties and adhesiveness was used. The average thickness of the insulation coating per single surface of the core single sheet was 1.5 μm or more and 8.0 μm or less.

In No. 8, an insulation coating was not formed.

In No. 7, two non-oriented electrical steel strips were heated and subsequently were pressurized using a guide roller.

In No. 8, the non-oriented electrical steel strips were pressurized using a guide roller after applying an adhesive between the non-oriented electrical steel strips.

In No. 9, the non-oriented electrical steel strips including the insulation coating were pressurized using a guide roller after applying an adhesive between the non-oriented electrical steel strips.

In Nos. 7 to 9, the applied pressure of the guide roller was 2.0 to 10.0 MPa. In No. 7, the surface temperature of the non-oriented electrical steel strips during the pressurization was higher than 50° C. In Nos 8 and 9, a thermosetting resin having adhesiveness was used as the adhesive, and the surface temperature of the non-oriented electrical steel strips during the pressurization was 15° C. to 50° C.

Next, the non-oriented electrical steel strips after the pressurization were inserted into a punching die and were punched in a predetermined core single sheet shape. By repeating this operation in synchronization, the core single sheets were laminated in the female die positioned on the most downstream side of the punching die. The laminated core single sheets were conveyed to a heating device and were heated to 180° C. to 250° C. to bond the core single sheets.

In No. 7, the non-oriented electrical steel strips were heated before the pressurization. Therefore, the non-oriented electrical steel strips before the punching were bonded, but the core single sheets after the punching were not bonded. In order to bond the core single sheets, bonding by an adhesive, caulking, welding, deposition, or the like is required, the productivity deteriorates.

In No. 8, the non-oriented electrical steel strips were bonded using an adhesive without forming an insulation coating. Therefore, as in No. 7, the non-oriented electrical steel strips before the punching were bonded, but the core single sheets after the punching were not bonded. In addition, since the insulation coating was not formed, the insulation properties deteriorated, and the magnetic characteristics deteriorated.

In No. 9, an adhesive was applied to the insulating film. Therefore, the space factor was less than that of Example 1 where an adhesive was not used.

Hereinabove, the embodiment and examples of the present invention have been described. The technical scope of the present invention is not limited to only the embodiment and Examples, and various modifications can be made within a range not departing from the scope of the present invention.

For example, the shape of the stator core 21 is not limited to only the configuration shown in the embodiment. Specifically, the dimensions of the outer diameter and the inner diameter of the stator core 21, the lamination thickness, the number of slots, a ratio between the dimensions of the tooth portion 23 in the circumferential direction and the radial direction, a ratio between the dimensions of the tooth portion 23 and the core back portion 22 in the radial direction, and the like can be freely designed depending on characteristics of a desired rotating electrical machine.

In the rotor 30 according to the embodiment, one set including two permanent magnets 32 forms one magnetic pole. However, the present invention is not limited to only this configuration. For example, one permanent magnet 32 may form one magnetic pole, and three or more permanent magnets 32 may form one magnetic pole.

In the embodiment, the permanent magnet motor has been described above as the rotating electrical machine 10. However, the structure of the rotating electrical machine 10 is not limited to only this example as described below. Various well-known structures not described below can also be further adopted.

In the embodiment, the permanent magnet motor has been described above as the rotating electrical machine 10. However, the present invention is not limited to only this example. For example, the rotating electrical machine 10 may be reluctance motor or an electromagnet field motor (field winding motor).

In the embodiment, the synchronous motor has been described above as the AC motor. However, the present invention is not limited to this example. For example, the rotating electrical machine 10 may be an induction motor.

In the embodiment, the AC motor has been described above as the rotating electrical machine 10. However, the present invention is not limited to this example. For example, the rotating electrical machine 10 may be a DC motor.

In the embodiment, the electric motor has been described above as the rotating electrical machine 10. However, the present invention is not limited to this example. For example, the rotating electrical machine 10 may be a generator. In addition, the present invention is also applicable to a transformer.

In addition, within a range not departing from the scope of the present invention, the components in the embodiment can be appropriately replaced with well-known components, and the modification examples may be appropriately combined.

BRIEF DESCRIPTION OF THE REFERENCE SYMBOLS

1: material, electrical steel strip
1A: coil
2: base steel sheet
3: insulation coating
10: rotating electrical machine
21: stator core
22: core back portion
23: tooth portion
30: rotor
31: rotor core
32: permanent magnet
33: through-hole
40: core single sheet
41a: bonding region
50: case

The invention claimed is:

1. A method of manufacturing a laminated core, using a manufacturing device, the method comprising:
   pressurizing two or more electrical steel strips including an insulation coating using a guide roller of the manufacturing device to temporarily bond the two or more electrical steel strips;
   temporarily bonding the two or more electrical steel strips without applying an adhesive immediately before punching;
   inserting the two or more temporarily bonded electrical steel strips into a punching die of the manufacturing device;
   simultaneously punching the two or more electrical steel sheets thereby obtaining core single sheets;
   heating the core single sheets after the punching to bond the core single sheets; and
   laminating the core single sheets without applying the adhesive after the punching,
   wherein the two or more electrical steel sheets are not heated before the pressurizing, during the pressurizing, and after the pressurizing and before the punching.

2. The method of manufacturing the laminated core according to claim 1, further comprising:
   during the temporary bonding, measuring a surface temperature of the two or more electrical steel strips to determine that the surface temperature is between 15° C. to 50° C.

3. The method of manufacturing the laminated core according to claim 2,
   wherein an applied pressure during the pressurization by the guide roller is 2.0 to 10.0 MPa.

4. The method of manufacturing the laminated core according to claim 3,
   wherein after the punching, the core single sheets are heated to 180° C. to 250° C. to mainly bond the core single sheets.

5. The method of manufacturing the laminated core according to claim 4,
   performing a tensile test to determine that a peeling strength of the two or more electrical steel strips after the temporary bonding is 5 N/cm² or higher.

6. The method of manufacturing the laminated core according to claim 3,
   performing a tensile test to determine that a peeling strength of the two or more electrical steel strips after the temporary bonding is 5 N/cm² or higher.

7. The method of manufacturing the laminated core according to claim 2,
   wherein after the punching, the core single sheets are heated to 180° C. to 250° C. to mainly bond the core single sheets.

8. The method of manufacturing the laminated core according to claim 7,
   performing a tensile test to determine that a peeling strength of the two or more electrical steel strips after the temporary bonding is 5 N/cm² or higher.

9. The method of manufacturing the laminated core according to claim 2,
   performing a tensile test to determine that a peeling strength of the two or more electrical steel strips after the temporary bonding is 5 N/cm² or higher.

10. The method of manufacturing the laminated core according to claim 1,
    wherein the pressurizing applied during the pressurization by the guide roller is 2.0 to 10.0 MPa.

11. The method of manufacturing the laminated core according to claim 10,
    wherein after the punching, the core single sheets are heated to 180° C. to 250° C. to mainly bond the core single sheets.

12. The method of manufacturing the laminated core according to claim 11,
    performing a tensile test to determine that a peeling strength of the two or more electrical steel strips after the temporary bonding is 5 N/cm² or higher.

13. The method of manufacturing the laminated core according to claim 10,
    performing a tensile test to determine that a peeling strength of the two or more electrical steel strips after the temporary bonding is 5 N/cm² or higher.

14. The method of manufacturing the laminated core according to claim 1,
    wherein after the punching, heating the core single sheets to 180° C. to 250° C. to mainly bond the core single sheets.

15. The method of manufacturing the laminated core according to claim 14,
    performing a tensile test to determine that a peeling strength of the two or more electrical steel strips after the temporary bonding is 5 N/cm² or higher.

16. The method of manufacturing the laminated core according to claim 1, further comprising:
    performing a tensile test to determine that a peeling strength of the two or more electrical steel strips after the temporary bonding is 5 N/cm² or higher.

* * * * *